(12) United States Patent
Perez Calero et al.

(10) Patent No.: US 10,234,331 B2
(45) Date of Patent: Mar. 19, 2019

(54) MONOLITHIC SPECTROMETER

(71) Applicant: Nederlandse Organisatie voor toegepast-natuurwetenschappelijk onderzoek TNO, s-Gravenhage (NL)

(72) Inventors: Daniel Perez Calero, s'-Gravenhage (NL); James Peter Robert Day, s'-Gravenhage (NL); Tom Duivenvoorde, s'-Gravenhage (NL); Marijn Sandtke, s'-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/026,283

(22) PCT Filed: Oct. 1, 2014

(86) PCT No.: PCT/NL2014/050676
§ 371 (c)(1),
(2) Date: Mar. 31, 2016

(87) PCT Pub. No.: WO2015/050443
PCT Pub. Date: Apr. 9, 2015

(65) Prior Publication Data
US 2016/0245693 A1    Aug. 25, 2016

(30) Foreign Application Priority Data
Oct. 2, 2013    (EP) .................................... 13187156

(51) Int. Cl.
*G01J 3/02*    (2006.01)
*G01J 3/18*    (2006.01)
*G01J 3/28*    (2006.01)

(52) U.S. Cl.
CPC ............ *G01J 3/0259* (2013.01); *G01J 3/0208* (2013.01); *G01J 3/0291* (2013.01); *G01J 3/18* (2013.01); *G01J 3/2823* (2013.01)

(58) Field of Classification Search
CPC ...... G01J 3/0259; G01J 3/2823; G01J 3/0208; G01J 3/0291; G01J 3/18
See application file for complete search history.

(56) References Cited

U.S. PATENT DOCUMENTS 3,748,015 A * 7/1973 Offner ................ G02B 17/0615
359/366
4,293,186 A * 10/1981 Offner .................. G02B 17/008
359/366

(Continued)

FOREIGN PATENT DOCUMENTS

| EP | 0067972 A1 | 12/1982 |
| FR | 2847978 A1 | 6/2004 |

OTHER PUBLICATIONS https://en.wikipedia.org/wiki/Bragg%27s_law.*

(Continued)

*Primary Examiner* — Mohamed K Amara
(74) *Attorney, Agent, or Firm* — Banner & Witcoff, Ltd.

(57) ABSTRACT

The present disclosure concerns a monolithic spectrometer for spectrally resolving light. The spectrometer comprises a body of solid material having optical surfaces arranged to guide the light along an optical path inside the body. A collimating surface and focusing surface are part of a single surface having a continuous optically functional shape. The surfaces of the body are arranged to have a third or fourth part of the optical path between a grating surface and an exit surface cross with a first part of the optical path between an entry surface and a collimating surface.

16 Claims, 7 Drawing Sheets

(56) References Cited

U.S. PATENT DOCUMENTS

| | | | | |
|---|---|---|---|---|
| 4,468,122 A * | 8/1984 | Puryaev | G01B 11/255 | 356/513 |
| 4,693,569 A * | 9/1987 | Offner | G02B 17/008 | 359/366 |
| 4,744,618 A * | 5/1988 | Mahlein | G01J 3/0259 | 385/33 |
| 4,747,678 A * | 5/1988 | Shafer | G02B 13/22 | 359/366 |
| 4,773,756 A * | 9/1988 | Blechinger | G01J 3/2823 | 356/328 |
| 5,812,262 A * | 9/1998 | Ridyard | G01J 1/429 | 250/372 |
| 5,815,278 A * | 9/1998 | Johnston | G01N 21/553 | 356/445 |
| 5,880,834 A * | 3/1999 | Chrisp | G01J 3/02 | 356/305 |
| 6,023,330 A * | 2/2000 | Marshall | G01J 3/02 | 356/328 |
| 6,081,331 A * | 6/2000 | Teichmann | G01J 3/02 | 356/328 |
| 6,100,974 A * | 8/2000 | Reininger | G01J 3/02 | 356/300 |
| 6,266,140 B1 * | 7/2001 | Xiang | G01J 3/18 | 356/305 |
| 6,278,534 B1 * | 8/2001 | Arns | G01J 3/02 | 356/334 |
| 6,303,934 B1 * | 10/2001 | Daly | G01J 3/02 | 250/339.02 |
| 6,587,198 B2 * | 7/2003 | Olshausen | G01J 3/02 | 356/328 |
| 6,886,953 B2 * | 5/2005 | Cook | G01J 3/02 | 359/858 |
| 6,980,295 B2 * | 12/2005 | Lerner | G01J 3/18 | 250/339.07 |
| 7,075,082 B2 * | 7/2006 | Tsao | G01J 3/02 | 250/339.07 |
| 7,148,488 B2 * | 12/2006 | Horton | G01N 21/33 | 250/372 |
| 7,161,673 B2 * | 1/2007 | Da Silva | G01J 3/02 | 356/328 |
| 7,180,590 B2 * | 2/2007 | Bastue | G01J 3/02 | 356/326 |
| 7,239,386 B2 * | 7/2007 | Chrisp | G01J 3/2823 | 356/328 |
| 7,330,258 B2 * | 2/2008 | Warren | G01J 3/02 | 356/328 |
| 7,808,635 B2 * | 10/2010 | Chrisp | G01J 3/02 | 356/326 |
| 7,812,949 B2 * | 10/2010 | Delmas | G01J 3/02 | 356/326 |
| 7,817,274 B2 * | 10/2010 | Zhang | G01J 3/02 | 356/328 |
| 7,898,660 B2 * | 3/2011 | Warren | G01J 3/02 | 356/328 |
| 8,345,226 B2 | 1/2013 | Zhang | | |
| 8,368,885 B2 * | 2/2013 | Shibayama | G01J 3/02 | 356/326 |
| 8,390,806 B1 | 3/2013 | Subramanian | | |
| 8,520,204 B2 * | 8/2013 | Desserouer | G01J 3/2823 | 356/326 |
| 8,564,775 B2 * | 10/2013 | Wein | G02B 6/2931 | 356/326 |
| 8,804,118 B2 * | 8/2014 | Shibayama | G01J 3/02 | 356/328 |
| 8,823,932 B2 * | 9/2014 | Comstock, II | G01J 3/0264 | 356/328 |
| 8,861,060 B2 * | 10/2014 | Puegner | G01J 3/0202 | 359/197.1 |
| 9,354,365 B2 * | 5/2016 | McLaughlin | G01J 3/02 | |
| 9,435,689 B2 * | 9/2016 | Comstock, II | G01J 3/2823 | |
| 9,625,317 B2 * | 4/2017 | Correns | G01J 3/18 | |
| 9,851,247 B2 * | 12/2017 | Shibayama | G01J 3/021 | |
| 9,863,809 B2 * | 1/2018 | Kuo | G01J 3/0291 | |
| 2006/0038997 A1 * | 2/2006 | Julian | G01J 3/02 | 356/328 |
| 2006/0139636 A1 * | 6/2006 | Kerstan | G01J 3/02 | 356/328 |
| 2006/0268269 A1 * | 11/2006 | Warren | G01J 3/02 | 356/328 |
| 2007/0194239 A1 * | 8/2007 | McAllister | G01J 3/0229 | 250/339.07 |
| 2007/0252989 A1 * | 11/2007 | Comstock | G01J 3/02 | 356/328 |
| 2009/0262346 A1 * | 10/2009 | Egloff | G01J 3/02 | 356/326 |
| 2013/0114077 A1 | 5/2013 | Zhang | | |
| 2016/0042221 A1 * | 2/2016 | Mei | G06K 9/0061 | 382/103 |

OTHER PUBLICATIONS https://www.edmundoptics.com/resources/application-notes/imaging/how-aberrations-affect-machine-vision-lenses.*

Nov. 25, 2014—International Search Report and Written Opinion of PCT/NL2014/050676.

* cited by examiner

MONOLITHIC SPECTROMETER

CROSS-REFERENCE TO RELATED APPLICATIONS

This application is a U.S. National Stage application under 35 U.S.C. § 371 of International Application PCT/NL2014/050676 (published as WO 2015/050443 A1), filed Oct. 1, 2014, which claims priority to Application EP 13187156.8, filed Oct. 2, 2013. Benefit of the filing date of each of these prior applications is hereby claimed. Each of these prior applications is hereby incorporated by reference in its entirety.

TECHNICAL FIELD AND BACKGROUND

The present disclosure relates to a monolithic spectrometer and an optical instrument comprising the monolithic spectrometer.

A spectrometer is an instrument used to probe a property of light as a function of its portion of the electromagnetic spectrum, e.g. for spectrally resolving the light. The term 'light' as used herein includes all forms of electromagnetic radiation such as visible, infrared and/or ultraviolet radiation. Typically, a spectrometer comprises reflective and/or refractive optics for guiding and shaping the light as well as a spectral resolving element such as a grating or prism for diffracting and/or dispersing the light in a wavelength dependent angle. Depending on the angle, different spectral components of the light can be imaged at different locations along a spectral axis in an imaging plane of the spectrometer. A sensor can be arranged for detecting spectral components of the light in the imaging plane.

A monolithic spectrometer comprises a body of solid material shaped to guide the light along an optical path inside the body. The body material is transparent at least to the wavelengths of light for which the spectrometer is intended to be used. For example, depending on the intended use, the material can be transparent to visible and/or infrared and/or ultraviolet radiation. The body shape comprises optical surfaces to transmit, reflect, shape (e.g. collimate or focus), refract (e.g. bend or disperse), and/or diffract the light as it travels along the optical path. Optionally, the optical surfaces may be coated, e.g. with a reflective material, or an optical piece such as a mirror or grating can be adhered to the optical surface to provide or aid the optical function of the surface. Advantages of a monolithic spectrometer over a regular spectrometer may include compactness, stability, and/or manufacturability.

One design of a monolithic spectrometer comprises an entry surface, a collimating surface, a grating surface, a focusing surface, and an exit surface. The entry surface is arranged to receive the light to enter into the body directed along a first part of the optical path. The collimating surface is arranged to receive the entering light directed along the first part of the optical path and to reflect said entering light as a collimated beam directed along a second part of the optical path. The grating surface is arranged to receive the collimated beam directed along the second part of the optical path and to reflect a diffracted beam directed along a third part of the optical path according to a wavelength dependent diffraction angle. The focusing surface is arranged to receive the diffracted beam directed along the third part of the optical path and to focus said diffracted beam directed along a fourth part of the optical path for imaging a wavelength component of the light onto a position along a spectral axis in an imaging plane outside the body. The exit surface is arranged in the optical path between the focusing surface and the imaging plane to have the light exit the body.

For example, U.S. Pat. No. 8,345,226 describes various embodiments of monolithic spectrometers including Czerny-Turner, crossed Czerny-Turner, and Fastie-Ebert configurations.

There is yet a need for an improved monolithic spectrometer that is both compact and easy to manufacture.

SUMMARY

Accordingly, the present disclosure provides a monolithic spectrometer for spectrally resolving light, the spectrometer comprising a body of solid material having optical surfaces arranged to guide the light along an optical path inside the body, the optical surfaces comprising an entry surface arranged to receive the light to enter into the body directed along a first part of the optical path; a collimating surface arranged to receive the entering light directed along the first part of the optical path and to reflect said entering light as a collimated beam directed along a second part of the optical path; a grating surface arranged to receive the collimated beam directed along the second part of the optical path and to reflect a diffracted beam directed along a third part of the optical path according to a wavelength dependent diffraction angle; a focusing surface arranged to receive the diffracted beam directed along the third part of the optical path and to focus said diffracted beam directed along a fourth part of the optical path for imaging a wavelength component of the light onto a position along a spectral axis in an imaging plane outside the body; and an exit surface arranged in the optical path between the focusing surface and the imaging plane to have the light exit the body; wherein the collimating surface and the focusing surface are part of a single surface having a continuous optically functional shape; and the surfaces of the body are arranged to have the third or fourth part of the optical path between the grating surface and the exit surface cross with the first part of the optical path between the entry surface and the collimating surface.

By providing a single optical surface combining the functions of collimating and focussing for different passes of the light, the number of optical surfaces can be reduced, thereby reducing manufacturing effort. By having the optical path after the grating surface cross with the optical path between the entry and the collimating surface, the light travels backwards through the body of the spectrometer past the point where it first hit the collimating surface. By providing the entry between the grating and the exit, the grating can be at one end of the body while the exit is at an opposite end of the body. In this way, an optical path length between the grating and exit can be increased while maintaining a compact design and not requiring additional optical surfaces. By increasing an optical path length between the grating and exit, a spectral resolving power of the spectrometer can be improved. An improved monolithic spectrometer is thus provided that is both compact and easy to manufacture.

By providing a single surface having continuous optically functional shape, the one or more optical functions of the surface can be continuous without interruptions, e.g. wherein the shape has a continuous geometric definition without discontinuities, e.g. wherein the shape has a continuous curvature at least along one dimension without discontinuities. The continuous surface may prevent unwanted disturbance of the light beam which may otherwise occur at the edges or discontinuities. While each part of the single surface is shaped to have an optical function, some parts of the surface can also have more than one function, e.g. focussing and collimating. For example, by having a continuous optically functional shape while sending light backwards into the spectrometer (i.e. crossing the previous path), a common area can be shared between the collimating surface and the focusing surface. This common area can be impinged by multiple passes of the light at different angles. By re-using the same optical surface for multiple passes, the design can be more compact and/or handle wider beams of light without clipping. The optical path length between the grating and exit can be further increased with minimal impact on the compactness by introducing an extra reflective surface between the focusing surface and the exit surface. Furthermore, by tilting the grating surface to increase the angle of incidence and/or angle of diffraction, a spectral resolution may be further improved for a given grating period without substantially influencing the compactness of the design. One way to have the optical path after the grating surface cross with the optical path between the entry and the collimating surface, is to provide a grating which diffracts the light backwards, e.g. in a negative grating order, in the same quadrant of the plane of incidence as the light impinging the grating surface, and with a diffraction angle that is larger, in absolute value, than the incidence angle. Another way may be to use a positive diffraction order in combination with a mirror to reflect the light backwards.

By providing one or both of the entry and/or exit surfaces with a curvature, these surfaces may be accommodated to provide a desired refractive function at the interface of the monolithic body, e.g. to either enhance or prevent refraction at the interface. In one example, the exit surface may be provided with a curvature to act as a lens to increase focussing of outgoing light. In another example, the entry surface may be curved e.g. for at least partially collimating an incoming beam. In this way a focal distance e.g. of the imaging plane or object plane can be closer to the body of the spectrometer thus improving overall compactness e.g. in the placement of a sensor or light source. To allow a longer path length e.g. of partially focussed light entering the body of the spectrometer, the entry surface can be arranged on a protruding shape that extends from a main part of the body.

To improve signal amplitude, a thickness of the body of the spectrometer can be increased in an out-of-plane direction transverse to the tangential plane of the optical path. The body can have a three dimensional shape arranged for accepting and spectrally resolving light from a line shaped light source or light delivery system extending in the out-of-plane direction. In one example, the entry surface may be provided with a curvature that is perpendicular to a diverging beam of incoming radiation. By having the entry interface perpendicular to the incoming light, undesired wavelength dependent refraction at the interface can be prevented, e.g. in the out-of-plane direction. In another example, the collimating and/or focusing surface can be provided with an out-of-plane curvature to reduce a divergence of light and prevent the light from hitting side surfaces of the spectrometer body.

The monolithic spectrometer can be comprised in an optical instrument. Advantageous properties of the spectrometer, such as compactness, robustness, and low manufacturing cost, may similarly apply to the optical instrument as a whole. This opens up the possibility for a wide variety of portable optical instruments performing spectral measurements. The optical instrument may optionally comprise one or more further components such as a light source and/or light guide (relay), and a sensor. In one embodiment, a laser light source is used to measure a Raman spectrum of a target sample. Light from the source and/or sample may e.g. be guided by optical fibres. Advantageously multiple fibres can be placed in on a line transverse to the tangential plane of the spectrometer body to increase the signal. Also a processor may be comprised in the instrument to control and read out the other components and/or analyse the spectrum.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
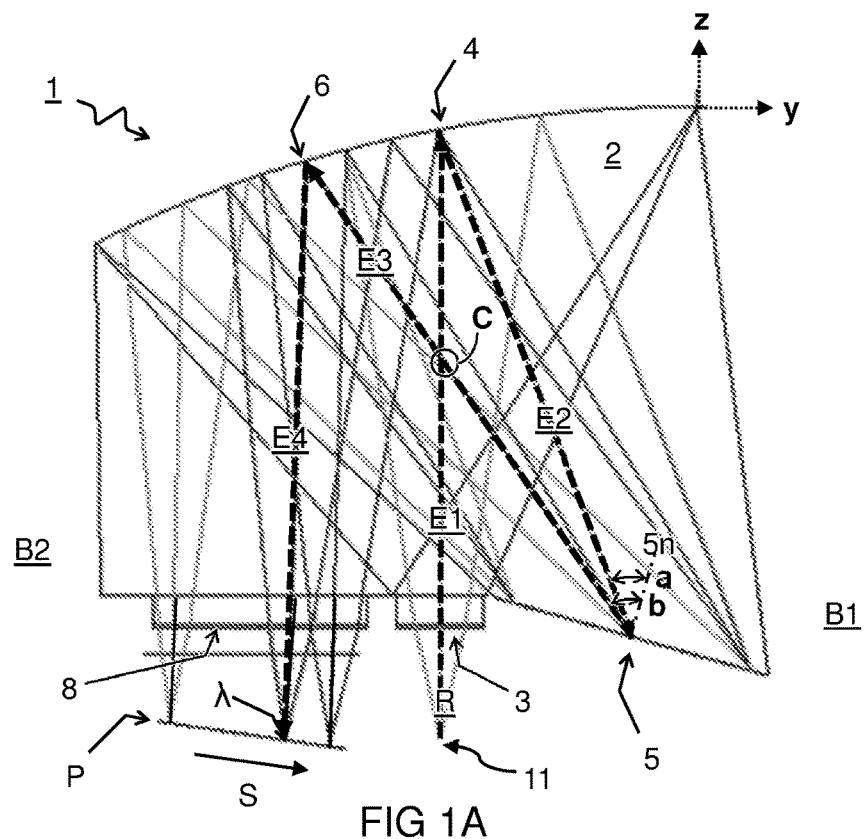
FIG. 1A shows a cross-section side view of a ray trace simulation of optical paths in a first embodiment of the monolithic spectrometer.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
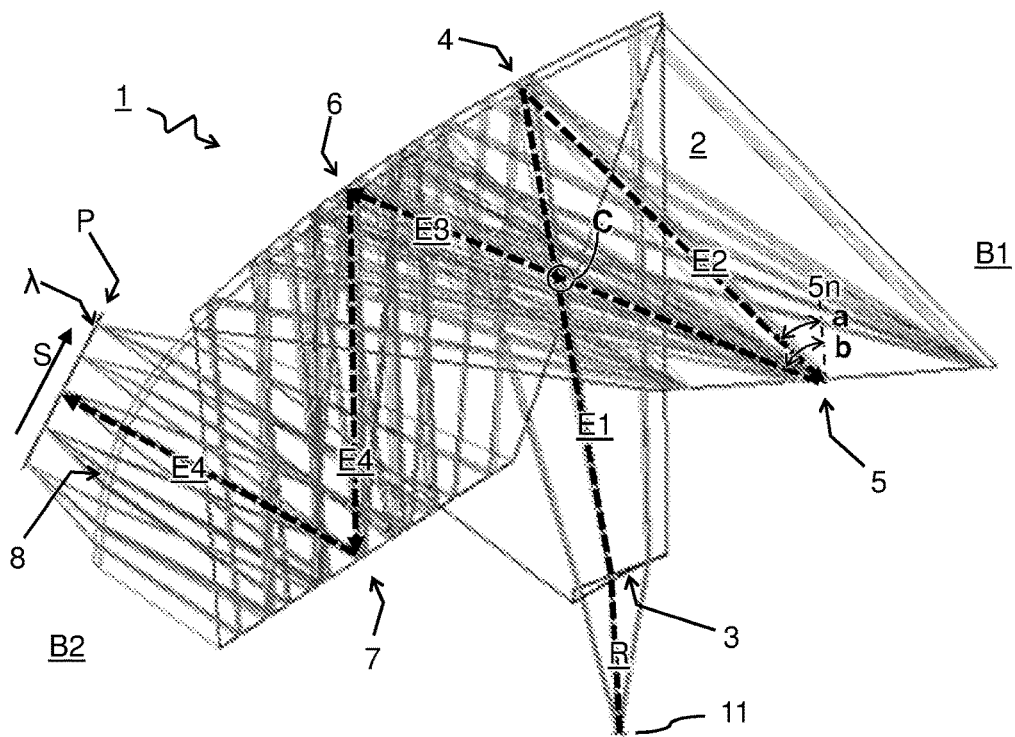
FIG. 1B shows a cross-section side view of a ray trace simulation of optical paths in a second embodiment of the monolithic spectrometer.
Figure 2A:
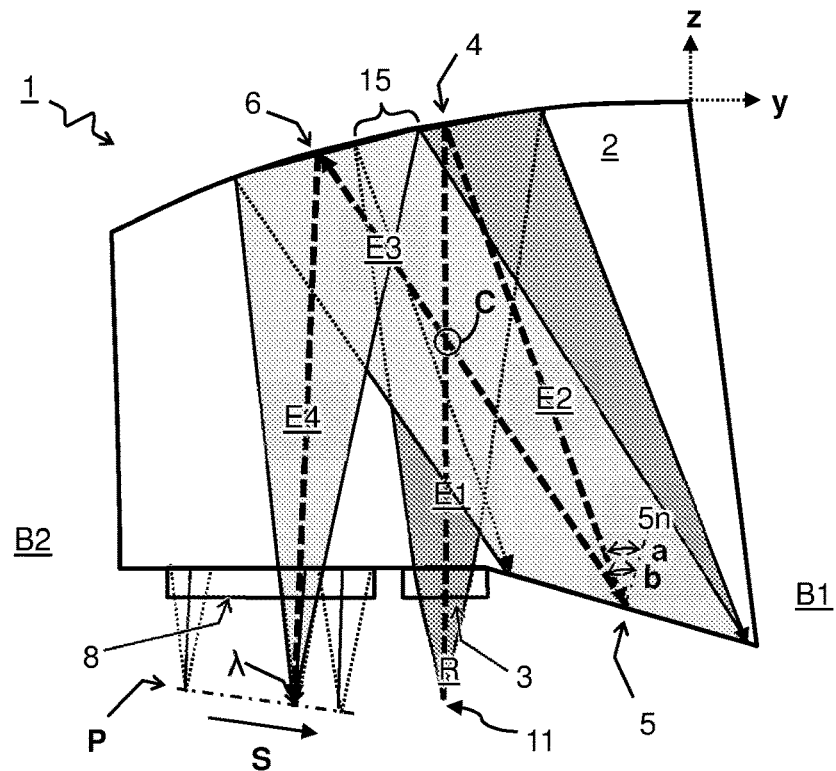
FIG. 2A shows the optical path in the first embodiment of a wide beam with one wavelength.
Figure 2B:
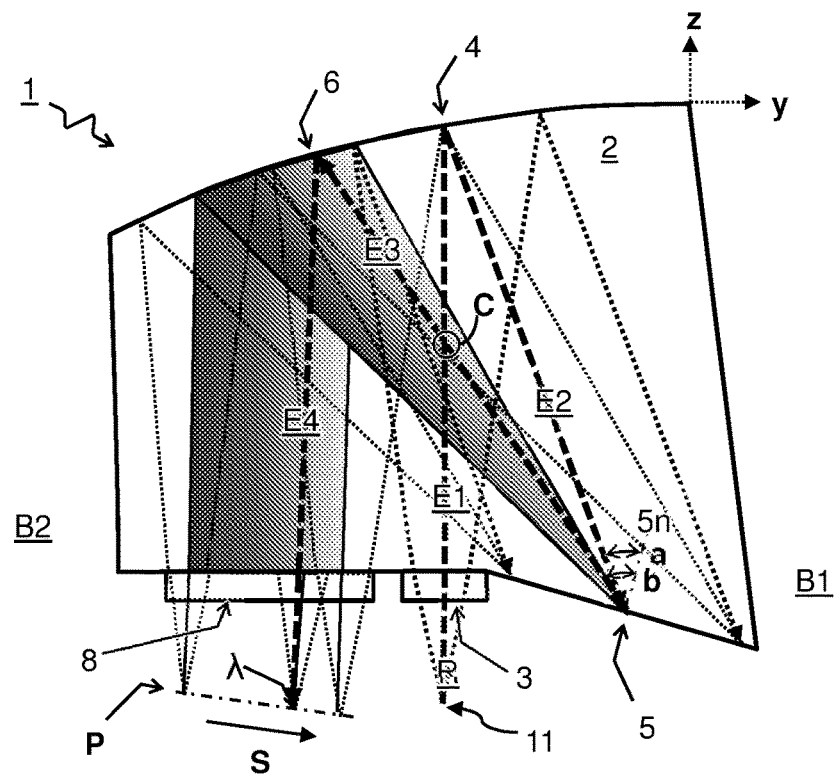
FIG. 2B shows the optical path in the first embodiment of a narrow beam with multiple wavelengths.
Figure 3A:
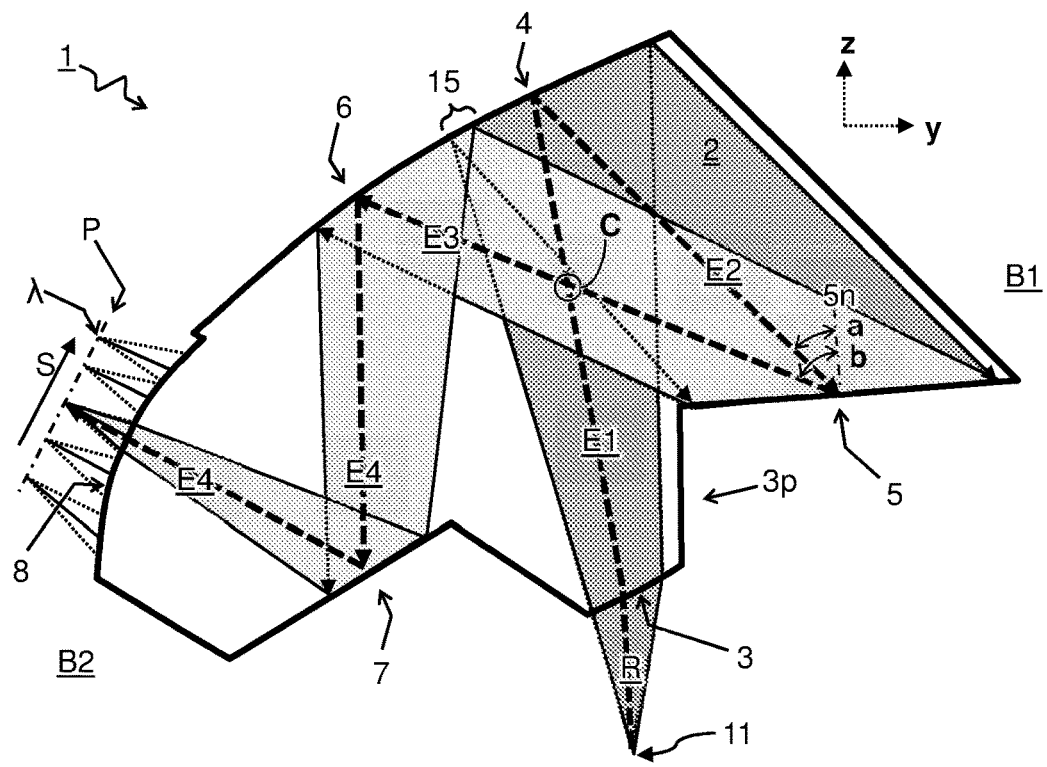
FIG. 3A shows the optical path in the second embodiment of a wide beam with one wavelength.
Figure 3B:
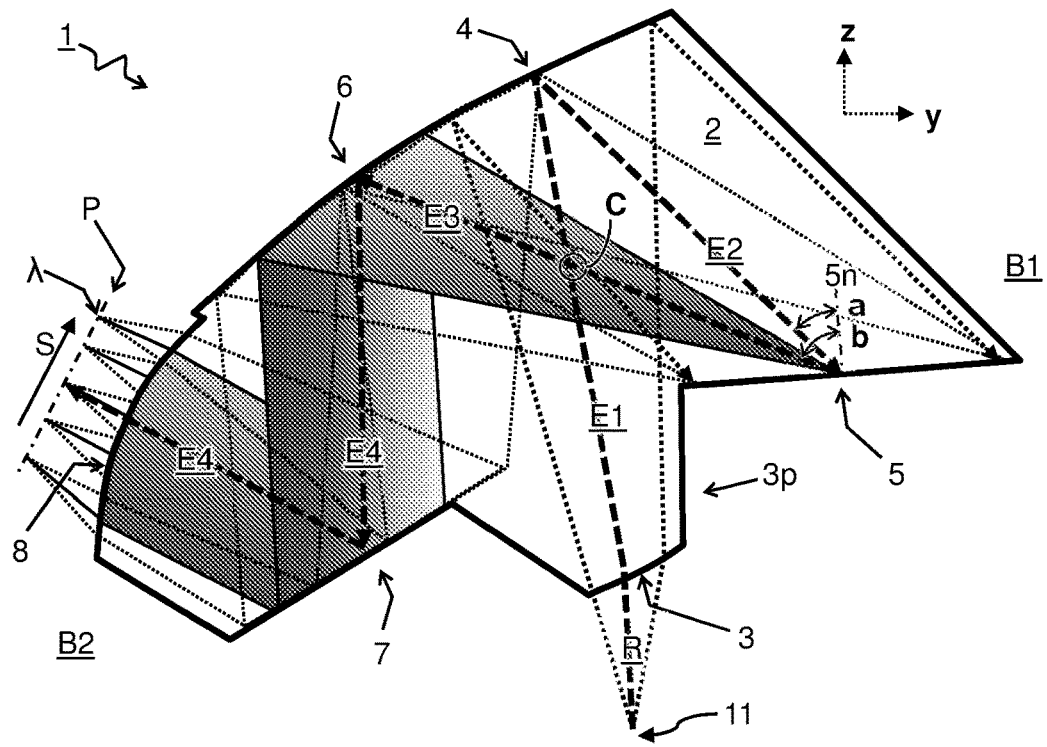
FIG. 3B shows the optical path in the second embodiment of a narrow beam with multiple wavelengths.

FIGS. 1A and 1B show ray trace simulations of optical paths in first and second embodiments of the monolithic spectrometer, respectively. Details of the first embodiment are further illustrated in FIGS. 2A and 2B and details of the second embodiment are further illustrated in FIGS. 3A and 3B. FIG. 2A illustrates the path of a wide beam with a single wavelength and FIG. 2B illustrates the path of a narrow beam with multiple wavelengths. FIGS. 3A and 3B illustrate similar paths as FIGS. 2A and 2B, but for the second embodiment.

With reference to any of the FIGS. 1-3, a monolithic spectrometer 1 for spectrally resolving light R is shown. The spectrometer 1 comprises a body 2 of solid material having optical surfaces arranged to guide the light R along an optical path E1,E2,E3,E4 inside the body 2. An entry surface 3 is arranged to receive the light R to enter into the body 2 directed along a first part E1 of the optical path. A collimating surface 4 is arranged to receive the entering light directed along the first part E1 of the optical path and to reflect said entering light as a collimated beam directed along a second part E2 of the optical path. A grating surface 5 is arranged to receive the collimated beam directed along the second part E2 of the optical path and to reflect a diffracted beam directed along a third part E3 of the optical path according to a wavelength dependent diffraction angle b. A focusing surface 6 is arranged to receive the diffracted beam directed along the third part E3 of the optical path and to focus said diffracted beam directed along a fourth part E4 of the optical path for imaging a wavelength component A of the light R onto a position along a spectral axis S in an imaging plane P outside the body 2. An exit surface 8 is arranged in the optical path between the focusing surface 6 and the imaging plane P to have the light E5 exit the body. Advantageously, the collimating surface 4 and the focusing surface 6 are part of a single surface having a continuous optically functional shape.

The optical surfaces are arranged to have the third and/or fourth part E3,E4 of the optical path between the grating surface 5 and the exit surface 8 cross with the first part E1 of the optical path between the entry surface 3 and the collimating surface 4. One such crossing is indicated in the figures by the reference "C". It will be understood that the term "cross" or "crossing" is meant to indicate that two parts of an optical path intersect with each other, at least when projected onto the tangential plane of the optical path. The tangential plane indicates the plane that is tangential to the optical path, or at least a main part thereof, i.e. the y-z plane in the present case. For a thin monolithic spectrometer, substantially all light will move parallel to the tangential plane. When the monolithic spectrometer get thicker, it may also accommodate light having a (small) transverse component, e.g. slightly diverging in the transverse direction while the light mainly moves in the tangential plane along its optical path. Typically, the tangential plane is parallel to the central plane through the middle of the spectrometer. The point of having the third and/or fourth part E3,E4 of the optical path cross with the first part E1 of the optical path, is that the exit surface 8 lies on the other side of the entry surface 3 with respect to the grating surface 5. This means that the exit surface 8 is maximally distanced from the grating surface 5 within a given compact shape of the body 2. Advantageously, the grating surface 5 is on one end B1 of the body 2 while the exit surface 8 is on the opposite end B2 of the body with the entry surface 3 therein between.

As indicated e.g. by the reference sign 15 in FIGS. 2A and 3A, a common optical area is shared between the collimating surface 4 and the focusing surface 6. The common area is impinged by multiple passes of the light. In particular, it will be noted that there is an overlap between the projections of the incoming beam E1 and the diffracted beam E3 on the shared surface 15. The same area 15 can function as both the collimating and focussing surface depending on the direction and collimation of the incoming beams. An entry beam traveling along the first part E1 of the optical path from the entry surface 3 and projected onto the common area 15 is reflected along the second part E2 of the optical path towards the grating surface 5. A diffracted beam traveling along the third part E3 of the optical path from the grating surface 5 and projected onto the common area 15 is reflected along the fourth part E4 of the optical path towards the exit surface 8.

In one embodiment, the grating surface 5 is arranged to diffract the collimated beam E2 backwards with respect to the surface normal $5n$ of the grating surface 5. Furthermore, in the embodiment, the diffraction angle b with respect to a surface normal $5n$ of the grating surface 5 is larger than an incidence angle a of the collimated beam with respect to the surface normal $5n$. For example, the diffracted beam can be in a negative diffraction order of the grating. Depending on convention, the diffraction angle in negative order can have a negative value. Alternative to a negative grating order, a positive grating order combined with an additional reflection between the grating and focussing surface may be used to steer the beam E3 back to cross the beam E1.

Preferably, the incidence angle a of the collimated beam with respect to a surface normal $5n$ of the grating surface 5 is at least 30 degrees. The diffraction angle b can be even larger, e.g. at least 40 degrees. By tilting the grating to increase the incidence angle and/or diffraction angle, a higher order diffraction may be utilized with higher spectral resolving power. Preferably, a grating order of the diffracted beam is minus one.

With reference to second embodiment of FIGS. 3A and 3B, a reflective surface 7 is arranged in the fourth part E4 of the optical path between the focusing surface 6 and the exit surface 8. In this way the fourth part E4 of the optical path can be folded up to have an even longer optical path between the grating surface 5 and the exit surface 8.

With continued reference to the second embodiment, the exit surface 8 has a curvature for at least partially focussing outgoing light in the imaging plane P. The curvature of the exit surface 8 may optionally be used to flatten the imaging plane P. It will be appreciated that the refraction on the interface can also be influenced by the refractive index of the body material.

In one embodiment, the entry surface 3 has a curvature and is arranged on a protruding shape 3p that extends from a main part 2s of the body 2, e.g. as shown in FIGS. 3A, 3B. For example, FIGS. 3A and 3B show that the interface of the entry surface 3 is slightly curved in the tangential direction to pre-collimate the incoming radiation R. In this way, the spectrometer can have acceptance for a source point 11 closer to the entry surface 3. The length of the protrusion 3p can be used to tune the combined focal power of the curvatures of the entry surface 3 and collimating surface 4.

In one embodiment, a curvature of the collimating/focussing surface 4,6 is described by a toroidal surface. Toroidal surfaces are e.g. formed by defining a curve in the y-z plane and then rotating this curve about an axis parallel to the y-axis and intersection the z-axis. Toroids can be defined using a curvature "r" (in the y-z plane), a conic constant "k" and optional polynomial aspheric coefficients $\alpha_1, \alpha_2, \ldots$. The curve in the y-z plane can e.g. be defined by $$z = \frac{ry^2}{1 + \sqrt{1 - (1+k)r^2y^2}} + \alpha_1 y^2 + \alpha_2 y^4 + \ldots$$

For example, to produce the surface 4,6 of the first embodiment the polynomial aspheric coefficients ($\alpha_1, \alpha_2, \ldots$) are set to zero, leaving only the fraction of the equation. Furthermore, the values r=1/(170.4592 mm) and k=1.163741 are set. The origin (y,z)=(0,0) is as indicated in FIG. 1A at the top right of the curve.

In one embodiment (not shown) the entry and collimating surfaces are combined as a single continuous optical surface. This may have additional advantages of manufacturability.

Figure 4A:
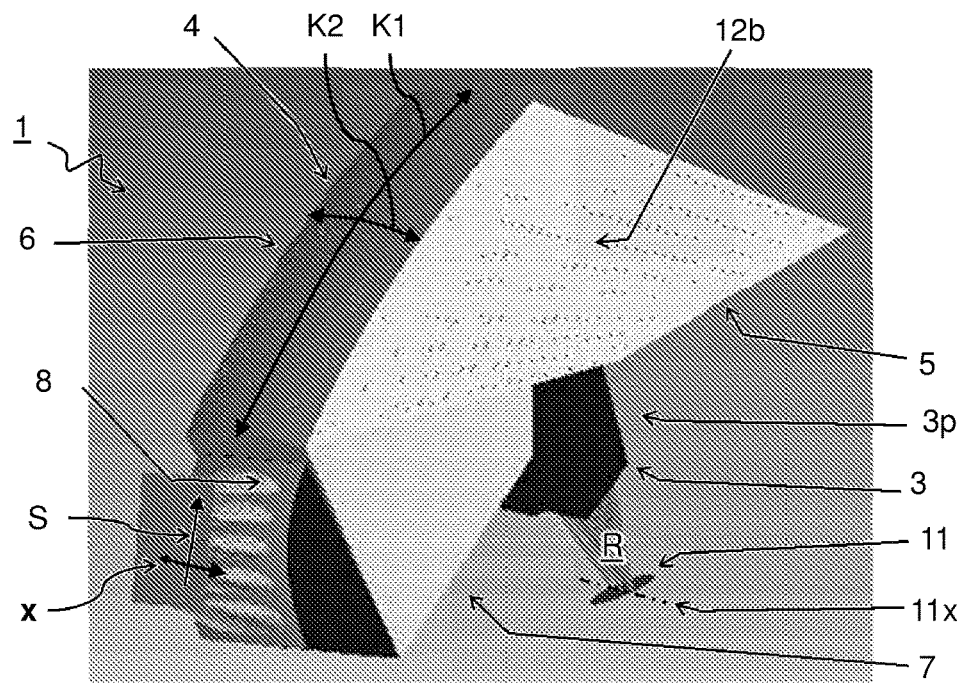
FIG. 4A shows a perspective front-side view of a ray trace simulation in the second embodiment.
Figure 4B:
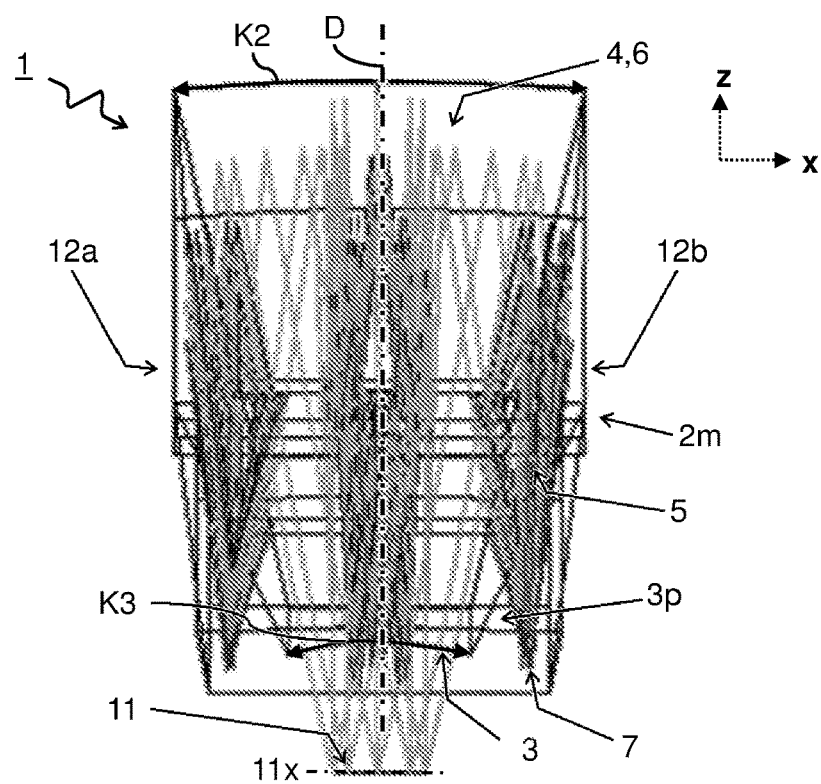
FIG. 4B shows a cross-section front view of a ray trace simulation of optical paths in the second embodiment of the monolithic spectrometer.

FIG. 4A shows a perspective front-side view of the second embodiment. FIG. 4B shows a cross-section front view of the second embodiment.

It will be appreciated that the body 2 is not necessarily flat but can have an essentially three dimensional shape, i.e. substantially extending in the out-of-plane direction x. By its thickness, the shape is able to handle more light entering the spectrometer and can yield a better signal. The three dimensional spectrometer is suitable for accepting and spectrally resolving light R from a line shaped light source 11x extending in an out-of-plane direction x transverse to a central or tangential plane D of the body as indicated in FIG. 4B. The line shaped source 11x is typically formed by a light relay, e.g. a slit or a row of optical fibres passing the light into the spectrometer from a light source of any shape. See e.g. FIG. 6B. The output from the three dimensional spectrometer may e.g. comprise an image of the line source that is spatially resolved for different spectral components along a spectral axis S transverse to a dimension x of the projected line.

In one embodiment, as shown in FIG. 4B, the entry surface 3 has a curvature K3 in an out-of-plane direction x that is transverse to the tangential plane D of the optical path. The curvature K3 may e.g. be used for reducing wavelength dependent refraction of incoming light in the out-of-plane direction x on the entry surface 3. In this way light input and acceptance angles of the spectrometer can be optimized.

In one embodiment, e.g. as shown in FIGS. 4A and 4B, the collimating surface 4 and/or focusing surface 6 have both an in-plane curvature K1 and an out-of-plane curvature K2. The in-plane curvature has the collimating and focussing functions along the optical path as described above with reference to e.g. FIGS. 3A and 3B. The out-of-plane curvature K2 is concave from a point of view inside the body 2 to reduce a divergence of light in the body of the spectrometer 1 moving in an out-of-plane direction x. By the out-of-plane curvature K2, it may be prevented that light in the spectrometer impinges the side surfaces 12a or 12b of the spectrometer. By preventing the light in the spectrometer body from impinging the side surfaces 12a,12b, undesired stray light from these side surfaces can be prevented. This may lower a requirements for optical quality, e.g. flatness, of the side surfaces 12a,12b.

To further prevent the light impinging the side surfaces 12a,12b, the main part 2m of the body 2 is made thicker in the out-of-plane direction x, e.g. compared to the entry surface 3 on the protruding shape 3p. This allows more room for the diverging beam to expand inside the spectrometer body.

In one embodiment, the body 2 of solid material is produced by moulding or casting a liquid precursor into a mould. The mould can e.g. be produced by rapid manufacturing or other suitable techniques. Alternatively or in addition, optical surfaces of the body 2 can be grinded and/or polished to produce any desirable (freeform) shape and optical quality. Optionally, additional layers are applied to one or more of the optical surfaces, e.g. anti-reflection layers for the entry surface 3 and the exit surface 8, reflective coating (e.g. metal layers) for the collimating surface 4, focusing surface 6, and reflective surface 7. Alternatively or in addition, the interfaces of the body 2 by themselves already possess a desired reflection and/or transmission characteristic such that no additional layers are required. Alternatively or in addition, external mirror and/or other optical surfaces can be adhered to the body 2. For example, a grating can be adhered, e.g. glued to the grating surface 5. Alternatively, a grating pattern can be etched into the grating surface 5.

Figure 5A:
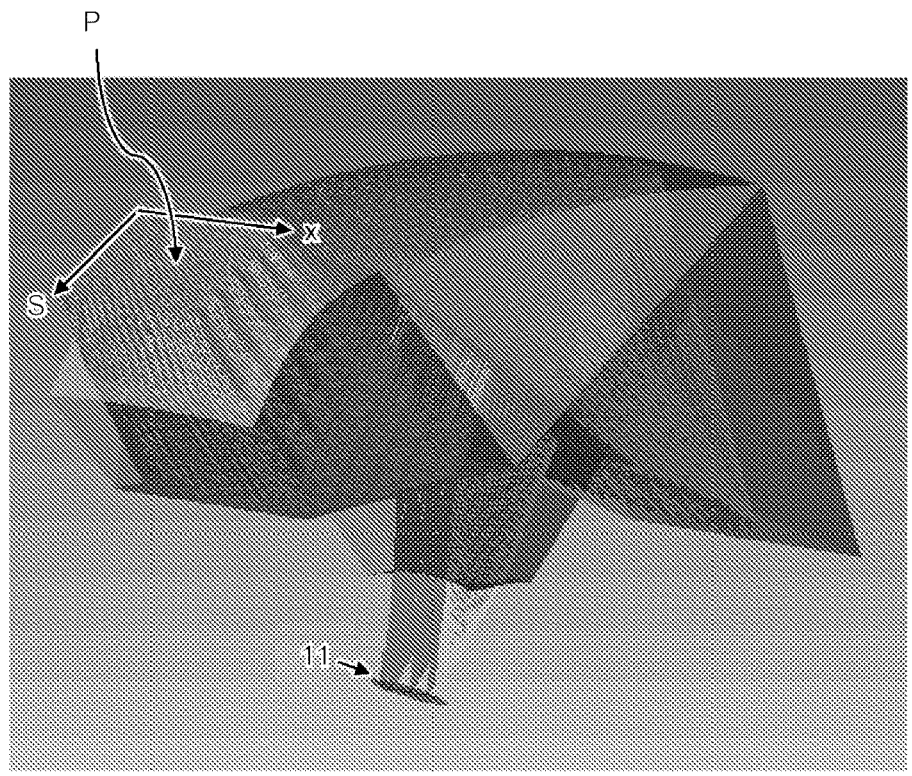
FIG. 5A shows a perspective front-side view of a ray trace simulation in the second embodiment with multiple point-light sources arranged transverse to the tangential plane.

FIG. 5A shows a perspective front-side view of the second embodiment wherein the body is made transparent to view the simulated rays inside. The simulation shows rays originating from multiple point-light sources 11 arranged transverse to a tangential plane of the body, travelling through the body and arriving at the imaging plane P.

Figure 5B:
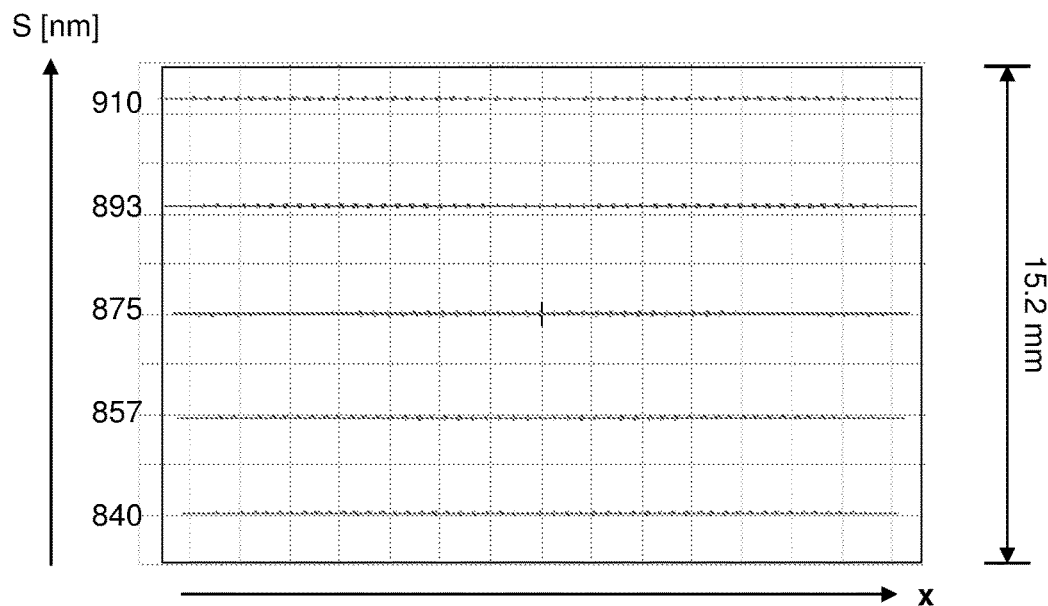
FIG. 5B shows a graph of the predicted image points at the imaging plane in the simulation of FIG. 5A.

FIG. 5B shows a graph of the predicted image points at the imaging plane P of the simulation of FIG. 5A. The wavelengths of the different points is also indicated. It will be appreciated that the wavelengths are neatly ordered along the spectral axis in separate lines extending in the transverse direction x. This is desired behaviour of the spectrometer since it allow the wavelengths to be distinguished on a sensor with sensing elements (e.g. a detector array) arranged in the imaging plane P. To give a sense of the spatial separation of the different wavelengths, a scale of 15.2 mm is drawn next to the graph.

Figure 6:
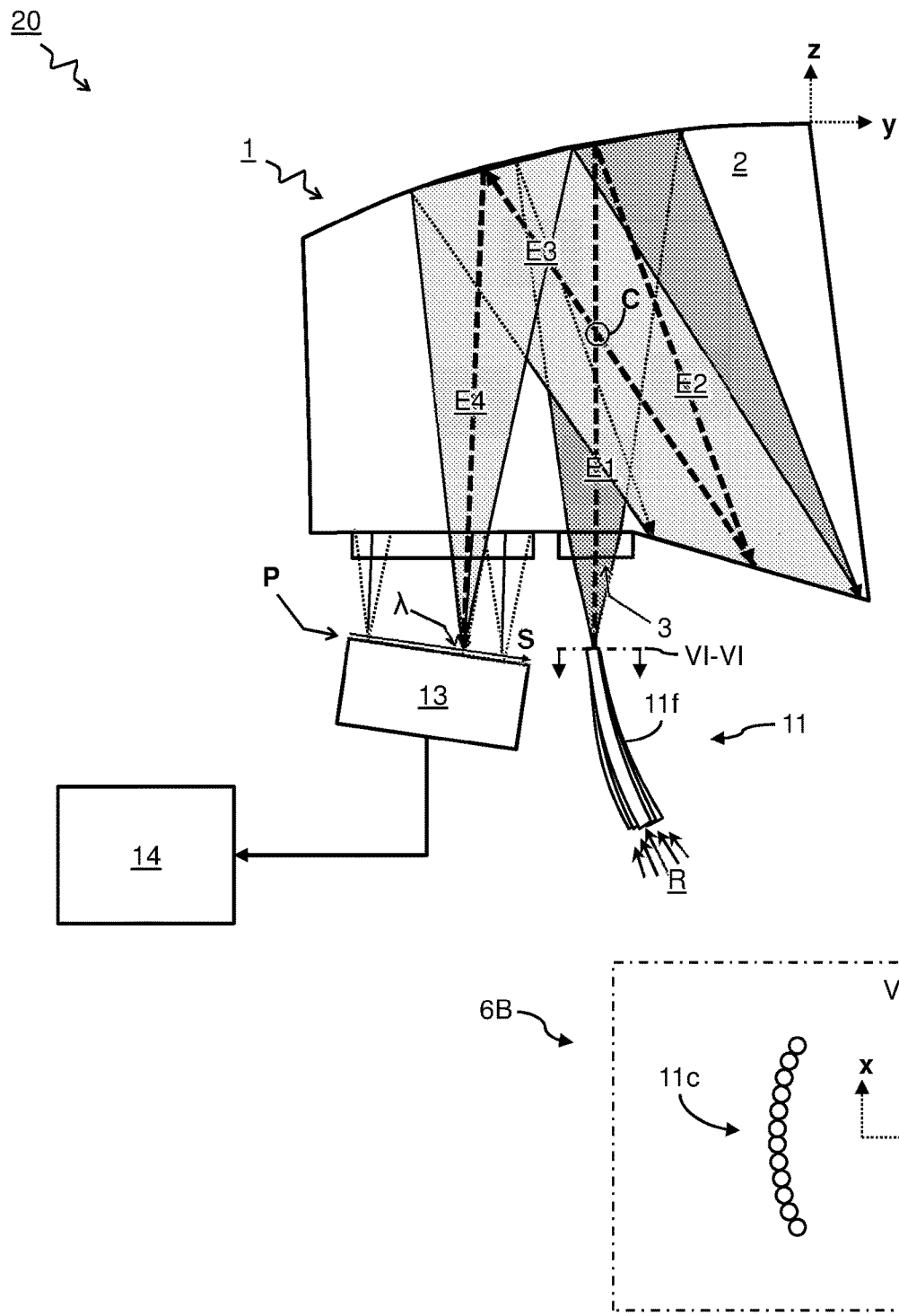
FIG. 6 shows an optical instrument comprising the first embodiment of the monolithic spectrometer.

FIG. 6 shows an optical instrument 20 comprising the monolithic spectrometer 1 of the first embodiment. Other embodiments of the spectrometer 1 may similarly be comprised in such an optical instrument 20. Apart from the spectrometer 1, the optical instrument 20 comprises a light source and/or relay 11 and a sensor 13. The light source and/or relay 11 is arranged for providing the light R to the entry surface 3. The sensor 13 arranged for detecting spectral components A of the light R in the imaging plane P. The spectrometer 1 is arranged for producing a spectrally resolved image of an output of the source and/or relay 11 in the imaging plane P at least along a spectral axis S in a direction of the spectral resolving. Alternative to a fibre bundle, also a single fibre can be used or even a free space light beam, e.g. in combination with a lens.

The inset FIG. 6B shows a top view of the output coupling of fibre bundle 11f along viewing direction VI-VI as indicated in the main figure.

In one embodiment, the light source and/or relay 11 is shaped as a line source 11x extending in an out-of-plane direction x transverse to a central plane D of the body 2. The optical instrument is arranged for detecting the spectral components A along the spectral axis S in the imaging plane P which spectral axis S is transverse to the out-of-plane direction x.

In one embodiment, the light source and/or relay 11 is shaped as a curved line source 11c parallel to the entry surface 3. A curvature of the curved line source may e.g. compensate a transfer function of the optical surfaces of the spectrometer and prevent an otherwise warped imaging of the spectrometer 1. In this way a flat image may be obtained in the imaging plane P.

In one embodiment, a relay 11 is formed by a fibre bundle coupling between a light source or origin and the entry surface 3. On one end of the fibre bundle, the fibres are arranged to form a straight or curved line transverse to the tangential plane of the spectrometer body. On another end of the fibre bundle, the fibres can be arranged in any suitable shape, e.g. circular, to gather as much light R as possible.

In one embodiment, the optical instrument 20 further comprises a processor 14 arranged to read out the sensor 13. Spectral components A can e.g. be distinguished along the spectral axis S on a surface of the sensor 13 and accumulated in a direction transverse to the spectral axis S on the surface of the sensor 13. It will be appreciated that it is not necessary that the image of the line source is reproduced in the transverse direction x, because all light falling at a particular position along the spectral axis can anyway be assumed to belong to a particular wavelength A. Consequently, the transverse curvature K2 is not required to provide collimation and/or focussing in the transverse direction x. It will be appreciated that divergence in the transverse direction x in principle will not influence the diffraction angle in the tangential plane when the lines of the grating are in the transverse direction.

Examples of advantageous optical instruments include e.g. a glucose measuring device comprising the monolithic spectrometer as described herein. The glucose measuring device may e.g. further comprise a (UV/VIS/IR) light source to illuminate a part of the skin (or other sample), and receive a resulting Raman signal e.g. from blood or interstitial fluid under the skin. The resulting Raman signal can e.g. by guided to the monolithic spectrometer by a fibre bundle coupling. The signal can be spectrally resolved by the spectrometer and glucose values in the blood and/or interstitial fluid can be determined, e.g. by a processor, based on characteristic Raman peaks in the measured spectrum. Advantageously, by the compactness and robustness of the present design spectrometer, such a glucose measuring instrument can be easily carried and handled, e.g. by a diabetic patient.

Also other optical instruments may be envisaged for measuring optical properties, e.g. using Raman or other spectroscopic techniques.

Figure 7:
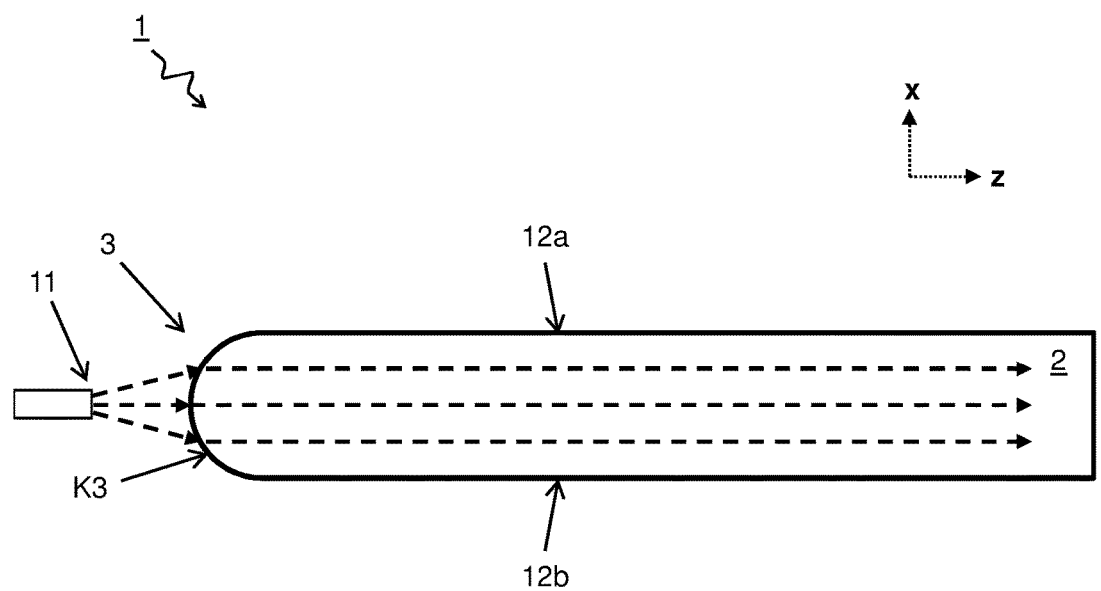
FIG. 7 shows a schematic cross-section view of an embodiment wherein the entry surface of the spectrometer is curved.

FIG. 7 shows a schematic cross-section view (x,z) of an embodiment wherein the entry surface 3 of the spectrometer 1 comprises an out-of-plane curvature K3. The curvature of the entry surface may act as collimating lens. For example, the entry surface 3 may have the shape of a cylindrical lens. By collimating the light before entering the body 2 of the spectrometer, it may be prevented that light in the spectrometer impinges the side surfaces 12a or 12b of the spectrometer. By preventing the light in the spectrometer body from impinging the side surfaces 12a,12b, undesired stray light from these side surfaces can be prevented. This may lower a requirements for optical quality, e.g. flatness, of the side surfaces 12a,12b. In one embodiment, the entry surface 3 comprises a convex surface from a point of view outside the body 2. In one embodiment, the entry surface is configure for collimating light rays from a divergent light source 11, e.g. an optical fibre held in front of the entry 3. In one embodiment, the entry surface 3 has both an out-of-plane curvature (K3) and an in-plane curvature (not shown). The in-plane curvature may e.g. also be configured to collimate the beam, but in a transverse direction (y,z).

While example embodiments were shown for a compact design monolithic spectrometer, also alternative ways may be envisaged by those skilled in the art having the benefit of the present disclosure for achieving a similar function and result. E.g. optical and electrical components may be combined or split up into one or more alternative components. The various elements of the embodiments as discussed and shown offer certain advantages, such as providing a compact design with excellent resolution. Of course, it is to be appreciated that any one of the above embodiments or processes may be combined with one or more other embodiments or processes to provide even further improvements in finding and matching designs and advantages. It is appreciated that this disclosure offers particular advantages to portable optical instruments, and in general can be applied for any application wherein a compact spectrometer can be used.

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, embodiments of methods are considered to inherently disclose their implementation in respective hardware, where possible, in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A monolithic spectrometer for spectrally resolving light, the spectrometer comprising a body of solid material having optical surfaces arranged to guide the light along an optical path inside the body, the optical surfaces comprising
an entry surface arranged to receive the light to enter into the body as an entry beam directed along a first part of the optical path;
a collimating surface arranged to receive the entry beam directed along the first part of the optical path and to reflect said entry beam as a collimated beam directed along a second part of the optical path;
a grating surface arranged to receive the collimated beam directed along the second part of the optical path and to reflect a diffracted beam, which is collimated and directed along a third part of the optical path according to a wavelength dependent diffraction angle;
a focusing surface arranged to receive the diffracted beam directed along the third part of the optical path and to focus said diffracted beam directed along a fourth part of the optical path for imaging a wavelength component of the light onto a position along a spectral axis in an imaging plane outside the body; and
an exit surface arranged in the optical path between the focusing surface and the imaging plane to have the light exit the body; wherein
the collimating surface and the focusing surface are part of a single toroidal surface having a geometrically continuous optically functional shape having an in-plane curvature in a central plane of symmetry dividing the body into two equal halves and an out-of-plane curvature in a plane transverse to the central plane, wherein the surfaces of the body are configured to have the third or fourth part of the optical path between the grating surface and the exit surface cross in a projection on the central plane with the first part of optical path between the entry surface and the collimating surface, and
wherein the collimating surface and the focusing surface share a common area therebetween, wherein an entry beam traveling along the first part of the optical path from the entry surface and projected onto a location within the common area is reflected along the second part of the optical path towards the grating surface, while a diffracted beam travelling along the third part of the optical path from the grating surface and projected onto the same location within the common area is reflected along the fourth part of the optical path towards the exit surface.

2. The monolithic spectrometer according to claim 1, wherein the body has a three dimensional shape arranged for accepting and spectrally resolving light from a line shaped light source extending in an out-of-plane direction transverse to the central plane of the body.

3. The monolithic spectrometer according to claim 1, wherein the entry surface has a curvature in a plane transverse to the central plane of the body.

4. The monolithic spectrometer according to claim 1, wherein the spectrometer comprises a protruding shape that extends from a main part of the body, wherein an end surface of the protruding shape forms the entry surface, wherein the protruding shape comprises connecting side walls that are separate from the entry surface in that the connecting side walls do not form optical surfaces, wherein the connecting side walls taper outwards in the out-of-plane direction between the entry surface and the main part of the body, which is thicker in the out-of-plane direction than the entry surface.

5. The monolithic spectrometer according to claim 4, wherein the entry surface has a concave out-of-plane curvature from a point of view outside the body.

6. The monolithic spectrometer according to claim 1, wherein the in-plane curvature is configured to provide collimating between the first part and the second part of the optical path, and to provide focusing between the third part and the fourth part of the optical path.

7. The monolithic spectrometer according to claim 6, wherein the out-of-plane curvature is concave from a point of view inside the body to reduce a divergence of light and prevent the light from hitting side surfaces of the spectrometer body.

8. The monolithic spectrometer according to claim 1, wherein the diffracted beam is reflected backwards along the third part of the optical path with respect to a surface normal of the grating surface wherein an absolute value of the diffraction angle is larger than an incidence angle of the collimated beam with respect to the surface normal.

9. The monolithic spectrometer according to claim 8, wherein an incidence angle of the collimated beam with respect to a surface normal of the grating surface is at least 30 degrees.

10. The monolithic spectrometer according to claim 1, wherein a reflective surface is arranged in the fourth part of the optical path between the focusing surface and the exit surface for folding said fourth part of the optical path.

11. The monolithic spectrometer according to claim 1, wherein the exit surface has a curvature for at least partially focussing outgoing light in the imaging plane.

12. An optical instrument comprising the monolithic spectrometer according to claim 1 and further comprising
a light source and/or relay for providing the light to the entry surface; and
a sensor arranged for detecting spectral components of the light in the imaging plane;
wherein the spectrometer is arranged for producing a spectrally resolved image of an output of the source and/or relay in the imaging plane at least along a spectral axis in a direction of the spectral resolving.

13. The optical instrument according to claim 12, wherein the light source and/or relay is shaped as a line source extending in an out-of-plane direction transverse to the central plane of the body, wherein the optical instrument is arranged for detecting the spectral components along the spectral axis in the imaging plane which spectral axis is transverse to the out-of-plane direction.

14. The optical instrument according to claim 12, further comprising a processor arranged to read out the sensor wherein spectral components are distinguished along the spectral axis on a surface of the sensor and accumulated in a direction transverse to the spectral axis on the surface of the sensor.

15. The optical instrument according to claim 12, wherein the light source and/or relay is shaped as a curved line source parallel to the entry surface, wherein a curvature of the curved line source compensates an otherwise warped imaging of the spectrometer for providing a flat image in the imaging plane.

16. A monolithic spectrometer for spectrally resolving light, the spectrometer comprising a body of solid material having optical surfaces arranged to guide the light along an optical path inside the body, the optical surfaces comprising:
   an entry surface arranged to receive the light to enter into the body as an entry beam directed along a first part of the optical path;
   a collimating surface arranged to receive the entry beam directed along the first part of the optical path and to reflect said entry beam as a collimated beam directed along a second part of the optical path;
   a grating surface arranged to receive the collimated beam directed along the second part of the optical path and to reflect a diffracted beam, which is collimated and directed along a third part of the optical path according to a wavelength dependent diffraction angle;
   a focusing surface arranged to receive the diffracted beam directed along the third part of the optical path and to focus said diffracted beam directed along a fourth part of the optical path for imaging a wavelength component of the light onto a position along a spectral axis in an imaging plane outside the body; and
   an exit surface arranged in the optical path between the focusing surface and the imaging plane to have the light exit the body,
   wherein the collimating surface and the focusing surface are part of a single surface having a geometrically continuous optically functional shape,
   wherein the surfaces of the body are configured to have the third or fourth part of the optical path between the grating surface and the exit surface cross in a projection on the central plane with the first part of the optical path between the entry surface and the collimating surface,
   wherein the collimating surface and the focusing surface share a common area therebetween, wherein an entry beam traveling along the first part of the optical path from the entry surface and projected onto a location within the common area is reflected along the second part of the optical path towards the grating surface, while a diffracted beam traveling along the third part of the optical path from the grating surface and projected onto the same location within the common area is reflected along the fourth part of the optical path towards the exit surface, and
   wherein an incidence angle of the collimated beam with respect to a surface normal of the grating surface is at least 30 degrees, wherein the diffracted beam is reflected backwards along the third part of the optical path with respect to a surface normal of the grating surface wherein an absolute value of the diffraction angle is larger than an incidence angle of the collimated beam with respect to the surface normal.

* * * * *